May 12, 1931.   F. J. KUBLER   1,805,461
ROOF AND PILLAR CONSTRUCTION FOR AUTOMOBILE BODIES
Filed Aug. 22, 1928   2 Sheets-Sheet 2
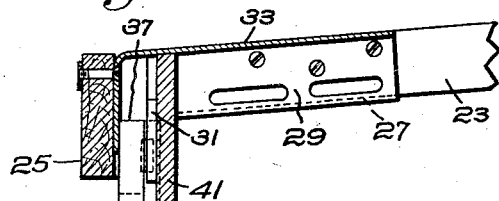
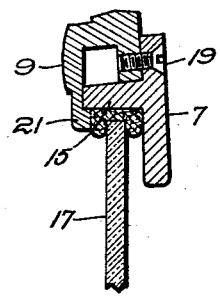
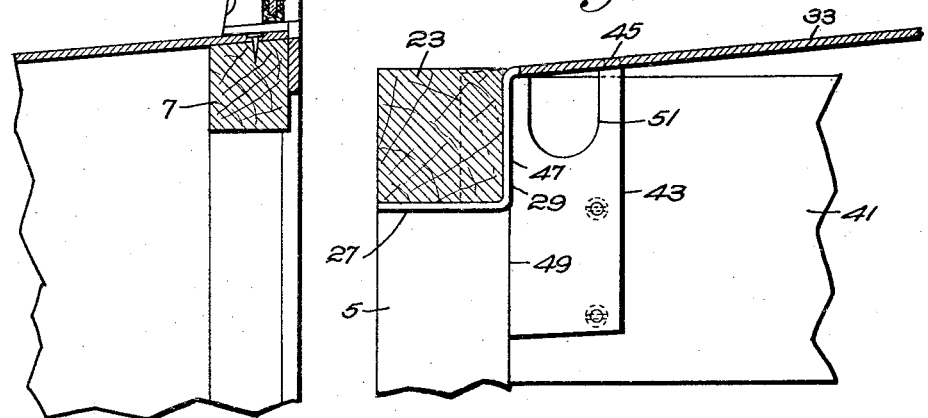
Inventor:
Frederick J. Kubler,
by Emery, Booth, Janney Varney
Attys Patented May 12, 1931

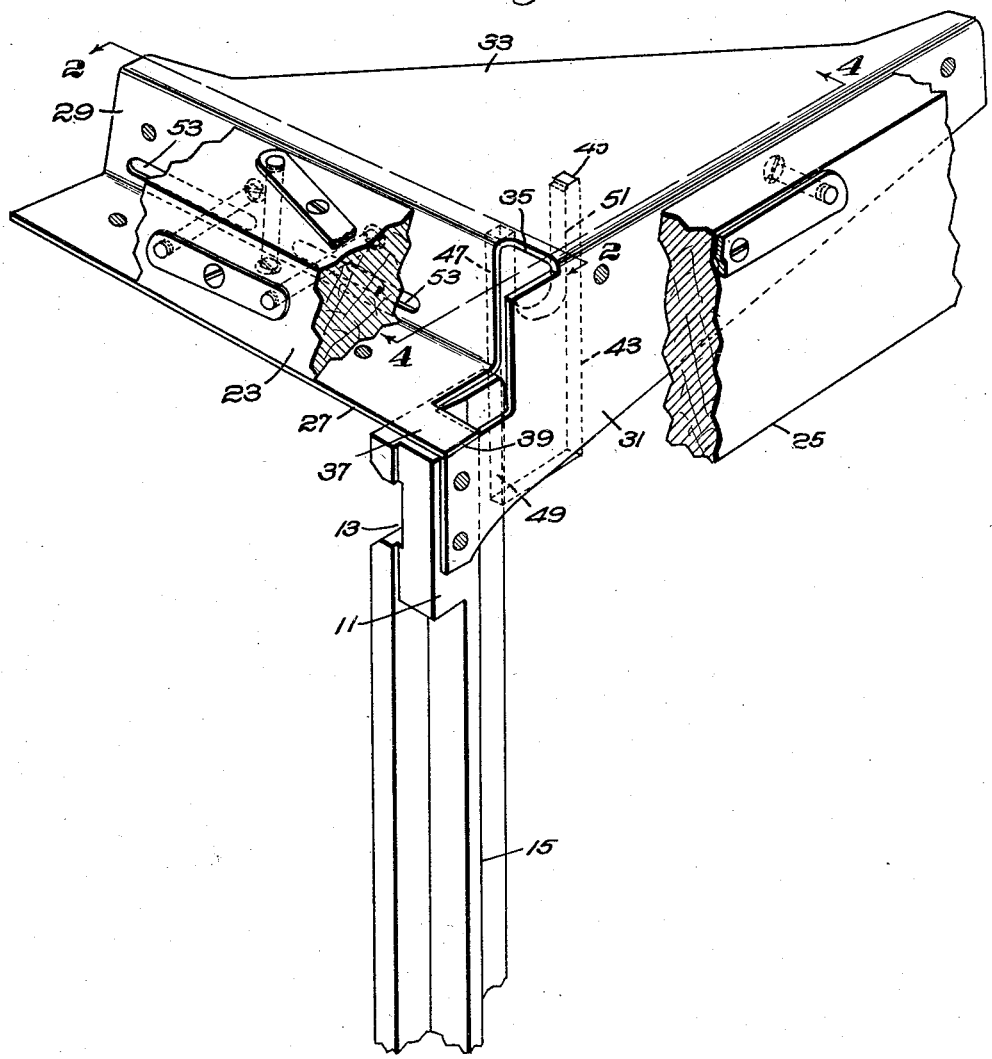

1,805,461

UNITED STATES PATENT OFFICE

FREDERICK J. KUBLER, OF NEW YORK, N. Y., ASSIGNOR TO A. F. CAMPBELL COMPANY, OF EAST BOSTON, MASSACHUSETTS, A CORPORATION OF MASSACHUSETTS

ROOF AND PILLAR CONSTRUCTION FOR AUTOMOBILE BODIES

Application filed August 22, 1928. Serial No. 301,323.

This invention relates to automobile bodies and the object is to provide such a construction thereof including an improved connection of the roof rails to the body pillars. The invention finds a particular application to automobiles in which the body pillars are of metal.

The invention will be well understood from the following description of a single illustrative embodiment shown by way of example in the accompanying drawings wherein is illustrated a construction embodying a sliding windshield to which the invention is particularly adapted although to which it is not limited.

In the drawings:—

Fig. 1 is a perspective of the upper end of a body pillar and the adjacent roof rails with parts broken away;

Fig. 2 is a section through the front of the vehicle body in the plane of the line 2—2 of Fig. 1 with parts broken away;

Fig. 3 is a section on the line 3—3 of Fig. 2; and

Fig. 4 is a section on the line 4—4 of Fig. 1.

By way of example of my invention I have herein shown a closed automobile body having a metallic body pillar at the forward corner. The pillar herein shown is of the type designed by Raymond Calpin of Everett, Massachusetts, and includes a drop forged body 5 incorporated (see Fig. 2) with the framing 7 adjacent the cowl of the vehicle and supporting the roof and also includes a die-cast finishing piece 9 providing the exposed surfaces of the pillar as a whole in the completed body. The main portion of the forging 5 consists of a transversely disposed web and at its upper end it may be thickened forwardly at 11 to accommodate the hinge mortise 13 at the rear side and it may be provided along its forward face with a rib 15, defining with the web a rabbet to receive the windshield 17 (see Fig. 3). In the embodiment of the invention shown the die-casting 9 fits over the web 15, is secured in position by the screws 19 and is provided with an extension or flange 21 completing the channel in which the windshield 17 slides.

Referring to Fig. 1, the side roof rail 23 and front roof rail 25 may be secured to the upper end of the pillar 5 by means of a suitable sheet metal anchor which herein takes the form generally of a trihedral angle. The side rail 23 may be received in an angular member having a horizontal flange 27 resting on and welded to the top of the pillar 5 and having a vertical flange 29 against which the inner side of the rail 23 rests, the rail being secured by suitable bolts in its seat in the angle. The front rail 25 rests on and is secured by suitable bolts to a bracket-like vertical plate 31, the outer end of which overlies the front face of the pillar 5, herein on the thickened portion 11, and is welded thereto in a vertical joint of suitable depth. The flange 29 and the plate 31 may be bent integrally from a web 33 constituting the third face of the trihedral angle and lying in a substantially horizontal plane and tying together flange 29 and plate 31 in the manner of a gusset.

To permit the edge of the windshield to pass in its elevated position in the case of a sliding windshield as herein, portions of the flanges 27 and 29 of the angular member which receives the side roof rail may be cut away, as indicated at 35. I prefer, however, to provide an extension 37 of the horizontal flange 27 reaching to and welded to plate 31 at the joint 39.

The roof elements are securely fastened to the pillar 5 and all elements of the corner construction are mutually interbraced in the most effective manner. The gusset plate 33 being secured to the upper edge of vertical flange 29 of the angle which receives the side roof rail remote from the joint of the horizontal flange 27 with the top of the pillar acts through a favorable lever arm to resist twisting strains on this joint and the strain is transmitted through the plate 31 to the long and substantial joint between said latter plate and the front of the pillar.

A sliding windshield is herein shown and a regulator board 41 (see Figs. 2 and 4) is provided parallel to the front rail 25. Herein I show a support for such a regulator board contributing to the stability of the structure and taking the form of a plate 43 to which the end of the board is screwed and which fits into the angle between the web 33 and the vetical flange 29. This plate may be provided with an integral stud 45 riveted and welded to web 33 and at its outer edge is joined by a welded seam at 47 to the flange 29. The plate extends downwardly below flange 27 and lies in the plane of the main web of the pillar 5 and is seamed thereto by welding 49 along the inner edge of the pillar. The plate 29 thus serves as a bracket, aiding in the support of the entire structure from the main structural member, to wit, the pillar 5, and also serves as an effectual reinforcement between web 33 and the angle 27—29 contributing to the rigidity of the structure as a whole.

The opening 51 shown in the plate 43 in Fig. 4 is provided to permit the passage of tools to obtain access to one of the bolts utilized in fastening front rail 25 and the openings 53 in flange 29 provide access to the wood of rail 23 to permit interior trimming to be secured thereto.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In an automobile body construction in combination with a body pillar, an angle receiving the roof side rail and having its horizontal flange resting on and secured to the top of the pillar, a vertical web to receive the roof front rail lapping on and secured to the front of the pillar, and a substantially horizontal web connecting said front rail web and the upright flange of said angle.

2. In an automobile body construction in combination with a body pillar, an angle receiving the roof side rail and having its horizontal flange resting on and secured to the top of the pillar, a vertical web to receive the roof front rail lapping on and secured to the front of the pillar, a substantially horizontal web connecting said front rail web and the upright flange of said angle, and a member for supporting a windshield regulator board bridging the angle between said web and flange.

3. In an automobile body construction in combination with a body pillar, an angle receiving the roof side rail and having its horizontal flange resting on and secured to the top of the pillar, a vertical web to receive the roof front rail lapping on and secured to the front of the pillar, a substantially horizontal web connecting said front rail web and the upright flange of said angle, and a member for supporting a windshield regulator board bridging the angle between said web and flange and depending to provide an outer edge lying along the inner side of the pillar.

4. In an automobile body construction in combination with a body pillar, a roof rail anchor of sheet metal forming a trihedral angle having faces to receive the roof front and side rails and a web tying them together, said faces having extensions contacting with and secured to the top-supporting pillar.

5. A roof rail anchor of sheet metal forming a trihedral angle having faces to receive the roof front and side rails and a web tying them together, said faces having extensions to contact with and be secured to the top-supporting pillar, a support for a windshield regulator board parallel to one of said faces and tying together the other face and said web, said angle being cut away in part to receive the edge of the windshield.

6. In an automobile body construction in combination with a metallic body pillar, an inwardly extending bracket-like plate secured to the forward face of said pillar for supporting the front roof rail, a plate having its edge abutting and seamed to the inner face of said pillar, and a substantially horizontal web tying together the upper edges of said plates.

7. In an automobile body construction in combination with a metallic body pillar, an angular support at the top of the pillar for receiving and embracing the top side rail, a bracket-like, substantially vertical web secured to the pillar and extending from adjacent the front face thereof below the top thereof to provide for attachment of the front top rail, and means tying together said web and angle whereby the latter is secured to the pillar by a connection of substantial vertical depth.

8. In an automobile body construction in combination with a metallic body pillar, an angular support for the top side rail having a horizontal flange at the top of the pillar and an upstanding flange, a bracket-like, substantially vertical web extending from adjacent the front face of the pillar below the top thereof to provide for attachment of the front top rail, and means tying together said web and upstanding flange whereby said angular support is braced at a point remote from its junction with the pillar.

9. In an automobile body construction in combustion with a metallic body pillar, a support extending rearwardly from the top thereof to receive the roof side rail, a plate extending inwardly adjacent the front thereof to support the roof front rail, said parts having spaced portions defining an opening aligned with the inner face of the pillar into which a sliding windshield may move in its raised position, and a substantially horizontal web bridging the angle between said parts and tying them together inwardly and rearwardly of said opening.

In testimony whereof, I have signed my name to this specification.

FREDERICK J. KUBLER.